Figures 1, 2:
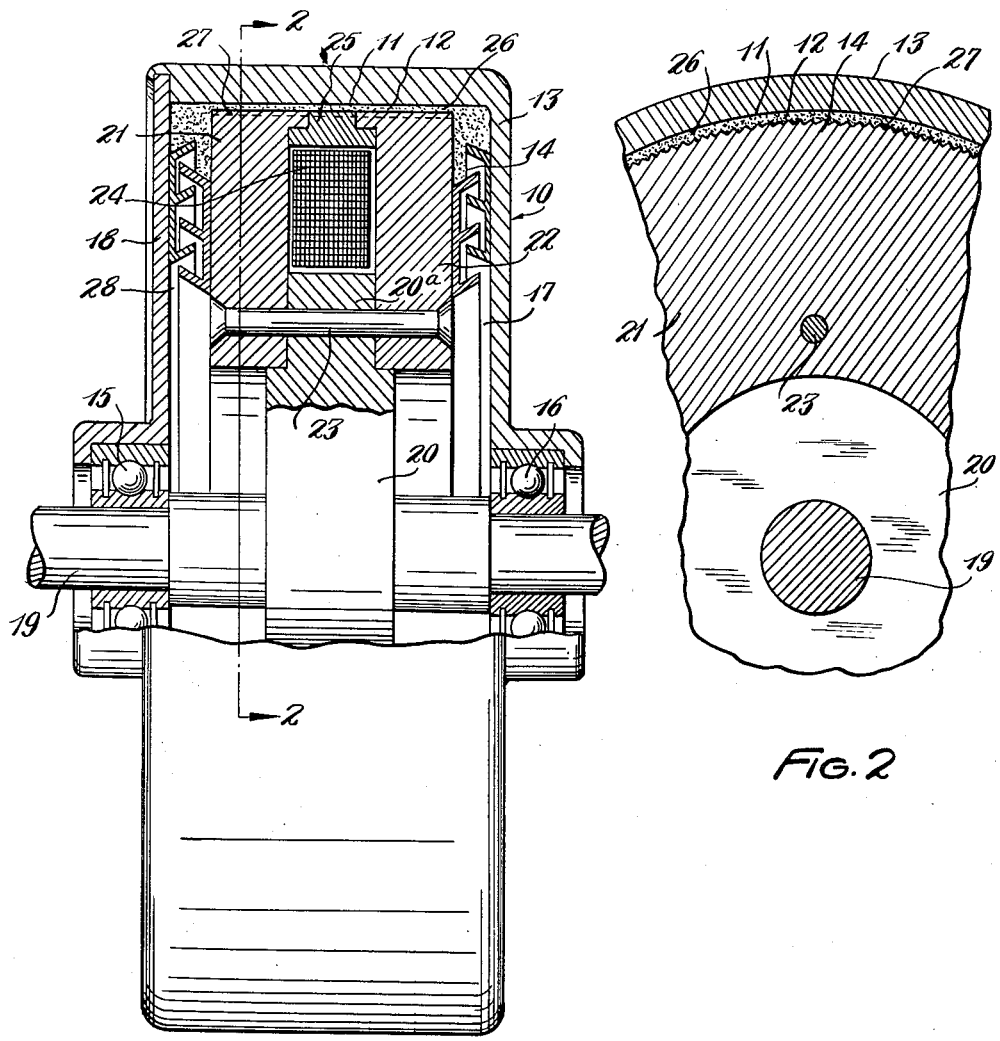

Sept. 3, 1957     A. S. GILL, JR     2,804,955
MAGNETIC FLUID MIXTURE COUPLING
Filed March 5, 1953

INVENTOR.
ANDREW S. GILL JR.
BY
Williams, David & Hoffmann
ATTORNEYS

United States Patent Office 2,804,955
Patented Sept. 3, 1957

2,804,955

MAGNETIC FLUID MIXTURE COUPLING

Andrew S. Gill, Jr., Maple Heights, Ohio, assignor to Eaton Manufacturing Company, Cleveland, Ohio, a corporation of Ohio Application March 5, 1953, Serial No. 340,427

9 Claims. (Cl. 192—21.5)

This invention relates to electromagnetic coupling devices usable as brakes, clutches, and the like, and more particularly, to such couplings incorporating a torque transmitting medium comprising finely divided magnetizable material. The invention is an improvement over the magnetic couplings disclosed in earlier United States Patents 2,519,449 granted August 22, 1950; 2,525,571 granted October 10, 1950; and 2,575,360 granted November 20, 1951.

An object of the present invention is to provide an electromagnetic coupling, or the like, of the character referred to above which will have highly satisfactory operating characteristics and stability with respect to its ability to transmit torque of a desired high value as well as a substantially constant value for a given extent of magnetization produced in the device, and whose ability to transmit high value torque with a substantially constant torque transmission characteristic will not be subject to a fading thereof, as has frequently occurred heretofore in devices of this kind due to heating of the magnetic torque transmitting medium, period of time during which the device has been in service and other causes.

Another object is to provide an electromagnetic coupling, or the like, of the character above indicated in which the magnetic torque transmitting medium comprises a finely divided ferromagnetic alloy and a conditioner mixed therewith, and which magnetic medium has not only the desired substantially constant and non-fading torque transmitting characteristic but also has the ability to transmit power or torque of a desired high value.

A further object is to provide such an improved electromagnetic coupling, or the like, in which the conditioner incorporated in the magnetic medium is both a lubricant and a torque restorer.

Still another object is to provide an electromagnetic coupling, or the like, of the kind above mentioned in which the magnetic torque transmitting medium comprises a finely divided ferromagnetic alloy and a lubricant, and embodies a conditioner comprising essentially a torque restorer in the form of a nonferrous material in finely divided form and effective on such medium for maintaining the torque transmitting characteristic thereof at, or restoring the torque transmitting characteristic thereof to, a desired high value.

A further object is to provide an improved electromagnetic coupling of the kind indicated above as embodying a stable torque transmitting magnetic medium, in which the ferromagnetic alloy constitutes a major proportion of the magnetic medium and is an alloy comprising at least one of the members of the group consisting of chromium, nickel and silicon, the alloy preferably being a finely divided stainless steel.

Yet another object is to provide such an improved electromagnetic coupling embodying a magnetic medium having a stable or substantially constant torque transmitting characteristic, in which the lubricant is preferably in finely divided form and constitutes a minor proportion of the magnetic medium, the lubricant preferably being molybdenum disulphide or graphite.

Additionally the invention provides an improved electromagnetic coupling of the type mentioned above in which the conditioner or torque restorer of the magnetic medium is in finely divided form constituting a minor proportion of such medium and is a member selected from the group consisting of bronze powder, copper powder, zinc oxide, lead oxide, nickel oxide, titanium oxide, mica and talc, the members of such group being named therein in order of preference.

The invention can be further briefly summarized as comprising the combinations of elements, arrangements of parts and features of construction hereinafter described and particularly set out in the claims hereof.

In the accompanying sheet of drawings:

Fig. 1 is an elevational view of an electromagnetic coupling embodying the present invention, the device being shown with a portion thereof in vertical axial section; and Fig. 2 is a partial transverse section taken as indicated by section line 2—2 of Fig. 1.

As one practical embodiment of the present invention, the drawing shows an electromagnetic coupling 10, hereinafter referred to merely as a magnetic coupling, which is of the type having a fixed annular air gap 11 and a quantity or body 12 of a flowable magnetic material disposed in such air gap as a power transmitting or torque transmitting medium. The term magnetic coupling as employed herein includes clutches and is also intended to include brakes, inasmuch as a brake is recognized as being a form of coupling or clutch in which one of the cooperating relatively rotatable members is held stationary.

The magnetic coupling 10 comprises, in general, a pair of relatively rotatable members defining the air gap 11 therebetween, and a magnetizable torque transmitting body or medium 12 in such gap. One of the relatively rotatable members, in this instance the outer or housing member 13 which is hereinafter referred to as the drum, is the driving or input member and the other or inner member 14, which is hereinafter referred to as the rotor, is the driven or output member. The drum 13 is mounted for rotation on suitable bearings 15 and 16 and defines a chamber 17 in which the rotor 14 is located and which chamber is closed by a cover 18.

The driving and driven relationship of the members 13 and 14 can be reversed if desired. The rotor 14 is mounted on a shaft 19 which projects from the bearings 15 and 16. The rotor is here shown as comprising a hub portion 20 and a pair of axially spaced annular rim elements 21 and 22 secured to an annular flange portion 20a of the hub by circumferentially spaced rivets 23, or the like. The hub portion 20 and the rim elements 21 and 22, as well as the drum 13, are all made of a suitable magnetic material.

For generating a magnetic flux field, the rotor 14 is provided with a magnetizing winding or toroidal field coil 24 located between the rim elements 21 and 22, such that the flux field links the drum and rotor across the air gap 11. The coil 24 is adapted to be supplied with energizing current through suitable connections of the slip ring type (not shown).

At a point between the rim elements 21 and 22 and outwardly of the winding 24, the rotor 14 is provided with a non-magnetic annular filler piece 25, such that the periphery of the rotor which is presented toward the internal annular surface of the drum 13 is continuous both axially and circumferentially of the rotor. If desired, the periphery of the rotor 14 can be provided with teeth or ridges 27, as shown in Fig. 2.

The torque transmitting medium 12 is a fluid confined in the air gap 11 by labyrinth packings 28 and is provided in suitable quantity, such that when this medium is magnetized by the flux produced by the winding 24, it assumes a more or less stiffened or solidified condition in which it resists shearing and is therefore capable of transmitting power or torque between the driving and driven members 13 and 14. The coupling effect produced between the driving and driven members 13 and 14, depends upon the extent of magnetization or solidification of the medium 12 and this, in turn, is dependent upon the extent of energization or ampere turns of the winding 24.

When the winding 24 is only partially energized, the magnetization of the medium 12 will be only a partial magnetization which will permit relative rotation or slip between the driving and driven members 13 and 14 accompanied by a shearing action in the torque transmitting medium. When the winding 24 is fully energized, the magnetized condition of the medium 12 will be such that this medium will effectively lock the driving and driven members for rotation together.

The torque transmitting medium as heretofore used in magnetic couplings of this character, has usually consisted of a mixture of substantially pure iron in finely divided form and a lubricant. The lubricant also has usually been a finely divided lubricant such as powdered graphite, although lubricants of other kinds and in other forms have used. The finely divided iron has usually been in the form of particles ranging in size from 4 microns in diameter to a size which will pass through a 300 mesh screen, and has usually been an iron having a high permeability and a low permanence characteristic or remanence such as to be comparatively easily magnetized in the presence of the magnetic field produced by the winding 24 and to readily lose its magnetization upon deenergization of the winding.

The lubricant has been used in the torque transmitting medium 12 for various purposes, including that of lubricating the iron particles to decrease the coefficient of friction therebetween and thus reduce the generation of heat, to coat the particles to protect them from oxidation, and to minimize attrition between the particles due to abrasion or scuffing therebetween. The lubricant has also served the important purpose of decreasing the wear on the drum and rotor due to the abrading action of the iron particles thereon.

Notwithstanding the presence of the lubricant in the magnetic medium, these earlier couplings have been subject to the above-mentioned disadvantage of instability and fading of the torque transmitting characteristic of the magnetic medium and this has created a difficult problem by rendering the couplings erratic and unreliable in service such as to make it difficult, if not impossible, to repeat a desired torque transmission value under a given set of operating conditions. The fading of the torque transmitting characteristic has usually consisted of both a short-term fading factor and a long-term fading factor. The short-term fading is associated with the heating of the magnetic medium during use of the coupling and is often a temporary factor which disappears more or less completely upon cooling of the magnetic medium. The long-term fading has been observed as extending over a substantial period of service of such couplings and as being more or less permanent.

This variation or fading in the torque transmitting characteristic of the magnetic medium may have resulted from changes in the magnetic properties of the medium due to heating or reheating thereof during use of the coupling. The variation or wading of the torque transmitting characteristic may also have been due, at least in part, to aging of the medium from various causes over a period of service of the coupling and dependent upon a number of variable factors such as slip, temperature, packing, settling, oxidation, attrition and others. Regardless of the cause thereof, such fading has been recognized as definitely occurring and as being a serious disadvantage for which it has not been possible to compensate by merely varying the flux field.

The torque transmitting medium 12 of the improved magnetic coupling 10 is a highly stable magnetic medium which provides the coupling with a substantially constant torque transmitting characteristic of a desired relatively high torque value for a given extent of magnetization produced by the winding 24. This improved result is obtained in part by employing as the base material of the magnetic medium 12, a ferromagnetic alloy or a mixture of ferromagnetic alloy and lubricant, and which base material is inherently substantially free from the undesirable variation or fading described above as resulting from heating effects and other causes. The improved result is also obtained in part from the use in the magnetic medium 12, of a conditioner in admixture with such a ferromagnetic alloy base material having a substantially non-fading torque characteristic. When the base material is a mixture of ferromagnetic alloy and lubricant, the conditioner is a torque restorer which is further described hereinafter but when the base material is only the ferromagnetic alloy, the conditioner is both a lubricant and a torque restorer and is, likewise, further described hereinafter.

In a coupling employing the magnetic medium 12 which embodies such a conditioner, the magnetic medium retains its ability to transmit a substantially constant torque of a satisfactory value, or of a desired relatively high value, between the relatively rotatable members 13 and 14 for a given extent of magnetization, regardless of aging of the device during a prolonged period of service and regardless of the repeated occurrence of relatively high operating temperatures which may cause the magnetic medium to be maintained at 750° F. or higher during intermittent periods of long or short duration.

As the ferromagnetic alloy, a finely divided or powdered stainless steel of the 400 series, as promulgated by the American Iron and Steel Institute (AISI), is preferred. The stainless steels of the 400 series which are suitable for this purpose can be further identified as the martensitic chromium steels and the ferritic chromium steels. These stainless steels are especially suitable for use in magnetic couplings because they are resistant to corrosion and are sufficiently permeable in the finely divided state at the temperatures to be encountered in such couplings, namely, temperatures up to or greater than 1000° F. The finely divided or powdered form of the stainless steel contemplates particles ranging in size from 4 microns to those which will pass through a 50 mesh screen. These stainless steels can also be referred to as steels which contain at least one member of the class which includes chromium and nickel.

Instead of stainless steel the ferromagnetic alloy of the magnetic medium 12 can be 4% silicon steel in powdered or finely divided form. This silicon steel is sufficiently permeable in the finely divided or powdered state to serve satisfactorily in magnetic couplings at the temperatures to be encountered therein, that is, temperatures up to or greater than 1000° F. Although the stainless steels of the 400 series and 4% silicon steel have been mentioned specifically, various other ferromagnetic alloys if found suitable for this purpose could be used.

Before proceeding with a more detailed description of the conditioner, it should be explained that a magnetic medium consisting of a mixture of a ferromagnetic alloy such as the stainless steel or the 4% silicon steel mentioned above, and a lubricant, has been proposed and tried out in a magnetic coupling but has been found to be generally unsatisfactory. The reason for this is that, although the lubricant contributed its important advantages already pointed out above, it also decreased or destroyed the torque transmitting ability or shear resistance of this particular magnetic medium to such an extent as to render the same impractical and unsatisfactory. The main achievement of this invention has therefore been to retain the advantages of the ferromagnetic alloy having the desirable non-fading torque characteristic, as well as the advantages of a lubricant used with this particular ferromagnetic alloy, and at the same time to maintain or restore a desired high torque transmitting ability or shear resistance for the magnetic medium through the use of the conditioner therein. The improved magnetic medium 12 embodying the conditioner also provides relatively low break away and drag values for the coupling when the magnet coil is deenergized.

When the magnetic medium 12 comprises a mixture of the above-mentioned ferromagnetic alloy of non-fading torque characteristic and a conditioner which is both a lubricant and a torque restorer, the conditioner can be any one of such nonferrous materials as zinc oxide, lead oxide, nickel oxide, titanium oxide, talc or mica. Any one of various other such conditioners, which may be found to be suitable as a combined lubricant and torque restorer, could be used. The conditioner in a finely divided or powdered form is mixed with the ferromagnetic alloy powder so as to constitute a minor proportion of the magnetic medium while the alloy constitutes a major proportion. The magnetic medium 12, when consisting of such a mixture of ferromagnetic alloy and a conditioner which is both a lubricant and torque restorer, will have a substantially constant torque transmitting characteristic and although the conditioner materials mentioned just above have a limited lubricating value, the magnetic medium will be suffiicently resistant to deterioration and attrition to render the magnetic coupling satisfactory for many practical applications.

As examples of torque transmitting medium 12 which will have the above-explained desirable chracteristics and advantages, the following compositions are given, the amounts of the ingredients being by weight:

*Example I*

|  | Parts |
|---|---|
| Ferromagnetic alloy—stainless steel 410–200 mesh | 100 |
| Conditioner—zinc oxide | ½ to 3 |

*Example II*

| Ferromagnetic alloy—stainless steel 410–200 mesh | 100 |
|---|---|
| Conditioner—talc | ½ to 3 |

*Example III*

| Ferromagnetic alloy—4% silicon steel—325 mesh | 100 |
|---|---|
| Conditioner—zinc oxide | ½ to 3 |

When the magnetic medium 12 comprises a mixture of a ferromagnetic alloy having a non-fading torque characteristic and a lubricant, and the torque restorer incorporated therein as an admixture, the lubricant is preferably powdered graphite or molybdenum disulphide in powder form and constitutes a minor proportion of the magnetic medium. Various other lubricants which may be found to be suitable for this purpose could be used instead.

As the torque restorer admixture incorporated in the magnetic medium 12 when the latter comprises such a mixture of ferromagnetic alloy and lubricant, a nonferrous material in finely divided or powdered form is used, preferably bronze powder, and constitutes a minor proportion of the magnetic medium. The term bronze powder is here used in a broad sense in which it is intended to embrace any and all of the various bronze alloys in powder form which are suitable for this purpose, including those bronze alloys which are composed essentially of copper in powder form or comprise copper powder in a major proportion.

Instead of using bronze powder, the torque restorer which is incorporated in the magnetic medium 12 in a minor proportion can be any one of such nonferrous materials in powder form as copper, zinc oxide, lead oxide, nickel oxide, titanium oxide, mica or talc. The magnetic medium 12 when consisting of such a mixture of ferromagnetic alloy and lubricant and having the bronze powder, or any one of the other above-mentioned torque restorers incorporated therein as an admixture, will be very stable and will not only have a substantially constant torque transmitting characteristic but will have a torque transmitting ability and shear resistance such that it will transmit a relatively large amount of torque in relation to a given extent of magnetization.

As additional examples of torque transmitting medium 12 which will have the above-explained desirable characteristics and advantages, the following compositions are given, the amounts of the ingredients being by weight:

*Example IV*

|  | Parts |
|---|---|
| Ferromagnetic alloy—stainless steel 410—300 mesh | 100 |
| Lubricant—molybdenum disulphide | 1 to 3 |
| Conditioner—zinc oxide | 1½ to 10 |

*Example V*

| Ferromagnetic alloy—stainless steel 410—300 mesh | 100 |
|---|---|
| Lubricant—powdered graphite | 1 |
| Conditioner—bronze powder | 1 |

*Example VI*

| Ferromagnetic alloy—4% silicon steel—200 mesh | 100 |
|---|---|
| Lubricant—molybdenum disulphide | 1 to 3 |
| Conditioner—zinc oxide | 1½ to 10 |

The precise manner in which the conditioner functions in the magnetic medium 12 is not known, but it is believed that the conditioner affects the internal coefficient of friction of the medium, that is to say, the coefficient of friction between the individual particles of the powdered ferromagnetic alloy. Thus, when lubricant is mixed with the powdered ferromagnetic alloy, the internal friction of the powdered alloy is reduced and although this is beneficial from the standpoint of decreasing heat generation, oxidation and attrition in the powdered alloy, it is also a disadvantage in that it decreases the torque transmitting ability or shear force of the powdered alloy, The conditioner which functions as both a lubricant and a torque restorer is effective on the powdered ferromagnetic alloy in a manner similar to a lubricant which reduces the internal coefficient of friction in the powdered alloy but still maintains a sufficient coefficient of friction, such that the powdered alloy will have a suitable torque transmitting characteristic or resistance to shear. In the case of the conditioner in the form of an additive to a magnetic medium comprising a mixture of ferromagnetic alloy and lubricant, the conditioner is essentially a restorer which restores sufficient internal friction in the powdered alloy to provide for the transmission of a desired high value of torque.

The amounts of the conditioner which are mixed with the ferromagnetic alloy of the magnetic medium 12, are more or less critical because if the conditioner is used in a smaller amount than the proportions indicated in the examples given above, the torque transmitting ability of the magnetic medium will not be maintained at or restored to the torque transmitting ability of the ferromagnetic alloy itself. Likewise, if the amount of conditioner used in the magnetic medium 12 is substantially greater than the amounts indicated in the examples given above, the torque transmitting ability of the magnetic medium will also be found to fall off and not be maintained at the desired high value.

From the foregoing detailed description and the accompanying drawing, it will now be readily understood that this invention provides an improved form of electromagnetic coupling in which the magnetic medium or fluid will have the ability to transmit a desired high value of torque at a substantially constant torque transmitting characteristic for a given flux field strength and will not be subject to the objectionable fading heretofore encountered in devices of this kind.

Although this improved electromagnetic coupling and the torque transmitting medium thereof have been disclosed herein to a somewhat detailed extent, it will be understood, of course, that the invention is not to be regarded as being limited correspondingly in scope, but includes all changes and modifications coming within the terms of the claims hereof.

Having thus described my invention, I claim:

1. In a magnetic coupling including relatively rotatable magnetizable members spaced from one another by a gap and means for generating a flux field interlinking said members across said gap; a magnetic medium in said gap adapted to transmit torque between said members and comprising by weight 100 parts of 4 percent silicon steel in finely divided form, ½ to 3 parts of lubricant, and ½ to 10 parts of a nonferrous material in finely divided form as a torque restorer comprising at least one member of the group consisting of bronze and copper.

2. In a magnetic coupling including relatively rotatable magnetizable members spaced from one another by a gap and means for generating a flux field interlinking said members across said gap; a magnetic medium in said gap adapted to transmit torque between said members and comprising by weight 100 parts of a finely divided ferromagnetic alloy including at least one member of the group consisting of chromium, nickel and silicon; ½ to 3 parts of lubricant; and a nonferrous material in finely divided form comprising at least one member of the group consisting of bronze and copper.

3. In a magnetic coupling including relatively rotatable magnetizable members spaced from one another by a gap and means for generating a flux field interlinking said members across said gap; a magnetic medium in said gap adapted to transmit torque between said members; said medium comprising at least 50 percent by weight of a finely divided ferromagnetic alloy including at least one member of the group consisting of chromium, nickel and silicon; not exceeding 25 percent of a finely divided lubricant comprising at least one member of the group consisting of molybdenum disulphide and graphite; and not exceeding 25 percent of a nonferrous material in finely divided form comprising at least one member of the group consisting of bronze, copper, zinc oxide, lead oxide, nickel oxide, titanium oxide, talc and mica.

4. In a magnetic coupling including relatively rotatable magnetizable members spaced from one another by a gap and means for generating a flux field interlinking said members across said gap; a magnetic medium in said gap adapted to transmit torque between said members and comprising by weight 100 parts of a finely divided ferromagnetic alloy which includes at least one member of the group consisting of chromium, nickel and silicon; ½ to 3 parts of a lubricant in finely divided form comprising at least one member of the group consisting of graphite and molybdenum disulphide; and ½ to 10 parts of a nonferrous material in finely divided form comprising at least one member of the group consisting of bronze, copper, zinc oxide, lead oxide, nickel oxide, titanium oxide, talc and mica.

5. A magnetizable fluid for use as a torque transmitting medium comprising; a mixture of 100 parts by weight of finely divided ferromagnetic alloy including at least one member of the group consisting of chromium, nickel and silicon; ½ to 3 parts of a lubricant in finely divided form comprising at least one member of the group consisting of molybedenum disulphide and graphite; and ½ to 10 parts of a nonferrous material in finely divided form comprising at least one member of the group consisting of bronze, copper, zinc oxide, lead oxide, nickel oxide, titanium oxide, talc and mica.

6. In a magnetic coupling; relatively rotatable magnetizable members defining an annular air gap therebetween and one of which members is a variably excitable field member adapted to generate a flux field interlinking said members through said gap; a magnetic fluid in said gap comprising by weight 100 parts of a finely divided ferromagnetic alloy of the kind having an inherent resistance to fading of its torque transmitting characteristic and ½ to 3 parts of lubricant and adapted when magnetized to transmit torque between said members; and ½ to 10 parts of bronze powder mixed with said fluid as a conditioning means and effective therein to substantially counteract decrease in torque transmission ability of said fluid due to the presence of said lubricant therein.

7. In a magnetic coupling including relatively rotatable magnetizable members spaced from one another by a gap and means for generating a flux field interlinking said members across said gap; a magnetic medium in said gap adapted to transmit torque between said members and comprising by weight 100 parts of a finely divided ferromagnetic alloy including at least one member of the group consisting of chromium, nickel and silicon, ½ to 3 parts of lubricant, and ½ to 10 parts of bronze powder.

8. A magnetizable fluid for use as a torque transmitting medium comprising; a mixture of 100 parts by weight of a finely divided ferromagnetic alloy of the kind having an inherent resistance to fading of its torque transmitting characteristic; ½ to 3 parts of lubricant; and ½ to 10 parts of bronze powder as a torque restorer effective to substantially counteract decrease in the torque transmitting ability of said fluid due to the presence of said lubricant therein.

9. A magnetizable fluid for use as a torque transmitting medium comprising; a mixture of 100 parts by weight of a finely divided ferromagnetic alloy including at least one member of the group consisting of chromium, nickel and silicon; ½ to 3 parts of lubricant in finely divided form comprising at least one member of the group consisting of molybdenum disulphide and graphite; and ½ to 10 parts of bronze powder.

References Cited in the file of this patent

UNITED STATES PATENTS

| | | |
|---|---|---|
| 711,123 | Rhoades | Oct. 14, 1902 |
| 2,519,449 | Findley | Aug. 22, 1950 |
| 2,525,571 | Winther | Oct. 10, 1950 |
| 2,705,064 | Lear | Mar. 29, 1955 |

FOREIGN PATENTS

| | | |
|---|---|---|
| 677,726 | Great Britain | Aug. 20, 1952 |

OTHER REFERENCES

Jones: Investigation of Magnetic Mixtures for Clutch Application, Dec. 3, 1952.

Technical Report 1213, National Bureau of Standards, Wash. D. C.

Engineering Report #27-Servomechanisms Laboratory, Dec. 13, 1950.

Design News, June 15, 1953.